United States Patent
Schaeffer et al.

(10) Patent No.: US 11,697,425 B1
(45) Date of Patent: *Jul. 11, 2023

(54) METHOD AND SYSTEM FOR ASSISTING DRIVERS IN LOCATING OBJECTS THAT MAY MOVE INTO THEIR VEHICLE PATH

(71) Applicant: Robert Schaeffer, New York, NY (US)

(72) Inventors: Robert Schaeffer, New York, NY (US); Joel Gilley, New York, NY (US)

(73) Assignee: Robert Schaeffer, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,387

(22) Filed: Dec. 19, 2022

Related U.S. Application Data

(63) Continuation of application No. 17/834,863, filed on Jun. 7, 2022, now Pat. No. 11,529,968.

(51) Int. Cl.
*B60Q 1/00* (2006.01)
*B60W 50/14* (2020.01)
(Continued)

(52) U.S. Cl.
CPC ............ *B60W 50/14* (2013.01); *B60K 35/00* (2013.01); *B60R 1/22* (2022.01); *B60R 11/04* (2013.01);
(Continued)

(58) Field of Classification Search
CPC .. B60W 50/14; B60W 30/0956; B60W 40/04; B60W 2050/143; B60W 2050/146;
(Continued)

(56) References Cited

U.S. PATENT DOCUMENTS 6,819,231 B2 11/2004 Berberich et al.
8,854,231 B2 10/2014 Thomas et al.
(Continued)

FOREIGN PATENT DOCUMENTS

CN 206589789 10/2017
CN 112985432 2/2022
(Continued)

OTHER PUBLICATIONS

Dasgupta, S., et al., An Augmented Reality Based Real Time Panoramic Vision System for Autonomous Navigation, IEEE Transactions on Systems, Man and Cybernetics, Part A, vol. 36, No. 1, Jan. 2006, p. 154-.
(Continued)

*Primary Examiner* — Toan N Pham
(74) *Attorney, Agent, or Firm* — Notio Law Group, LLC

(57) ABSTRACT

A system and method for assisting drivers of vehicles are described. The systems and methods provide an extended view of the area surrounding the driver's vehicle while providing real-time object trajectory for objects and other vehicles that may enter the driver's reactionary zone. The system and methods capture images of the area surrounding the driver's vehicle and create a composite image of that area in real-time and using Augmented Reality (AR) create a 3-D overlay to warn the driver as objects or other vehicles enter the driver's reactionary zone so that a driver can make more informed driving decisions.

20 Claims, 13 Drawing Sheets

(51) Int. Cl.

| | |
|---|---|
| *B60W 40/04* | (2006.01) |
| *B60R 1/22* | (2022.01) |
| *B60R 11/04* | (2006.01) |
| *B60K 35/00* | (2006.01) |
| *G06V 10/70* | (2022.01) |
| *G06V 20/58* | (2022.01) |
| *G06N 20/00* | (2019.01) |
| *B60W 30/095* | (2012.01) |
| *B60R 11/00* | (2006.01) |

(52) U.S. Cl.
CPC ........ *B60W 30/0956* (2013.01); *B60W 40/04* (2013.01); *G06N 20/00* (2019.01); *G06V 10/70* (2022.01); *G06V 20/58* (2022.01); *B60K 2370/176* (2019.05); *B60K 2370/177* (2019.05); *B60K 2370/1868* (2019.05); *B60K 2370/193* (2019.05); *B60R 2011/004* (2013.01); *B60R 2300/105* (2013.01); *B60R 2300/303* (2013.01); *B60W 2050/143* (2013.01); *B60W 2050/146* (2013.01); *B60W 2556/60* (2020.02)

(58) Field of Classification Search
CPC ............... B60W 2556/60; B60K 35/00; B60K 2370/176; B60K 2370/177; B60K 2370/1868; B60K 2370/193; B60R 1/22; B60R 11/04; B60R 2011/004; B60R 2300/105; B60R 2300/303; G06N 20/00; G06V 10/70; G06V 20/58
See application file for complete search history.

(56) References Cited

U.S. PATENT DOCUMENTS

| | | | |
|---|---|---|---|
| 10,332,292 B1* | 6/2019 | Arnicar | G06F 3/011 |
| 2020/0247412 A1* | 8/2020 | Wang | G02B 27/01 |
| 2020/0307616 A1* | 10/2020 | Nithiyanantham | G02B 27/0101 |
| 2022/0093020 A1* | 3/2022 | Kamiya | B60K 35/00 |
| 2022/0135027 A1* | 5/2022 | Bravi | G06F 18/24 701/119 |
| 2022/0153262 A1* | 5/2022 | Gallo | G08G 1/165 |

FOREIGN PATENT DOCUMENTS

| | | | |
|---|---|---|---|
| DE | 10037128 | 4/2001 | |
| DE | 10037129 | 4/2001 | |
| GB | 2514151 A * | 11/2014 | ............... B60R 1/00 |
| JP | 2013024662 | 2/2013 | |

OTHER PUBLICATIONS

Lui, Y. et al., Bird's-Eye View Vision System for Vehicle Surrounding Monitoring, G. Sommer and R. Klette (Eds.): RobVis 2008, LNCS 4931, pp. 207-218, 2008, Springer publishing.

* cited by examiner

METHOD AND SYSTEM FOR ASSISTING DRIVERS IN LOCATING OBJECTS THAT MAY MOVE INTO THEIR VEHICLE PATH

BACKGROUND OF THE DISCLOSURE

Field of the Disclosure

The present disclosure describes a system and method for assisting drivers of vehicles by providing an extended and/or enhanced view of the area surrounding the driver's vehicle while providing real-time object trajectory for objects and other vehicles that may enter the driver's reactionary zone. More particularly, the disclosure describes a system and method that provides an extended view of the periphery of the driver's vehicle in multiple available directions allowing a driver to see and react to objects or other vehicles before they are directly proximate the driver's vehicle. Further, the disclosure describes a method and system for capturing images of the area surrounding the driver's vehicle and creating a composite image of that area in real-time. Still further, the disclosure describes a method and system using Augmented Reality (AR) to create a 3-D overlay which may be placed over the composite image, and which can warn the driver as objects or other vehicles enter the driver's reactionary zone so that a driver can make more informed driving decisions.

Background

Driver-assist cameras have become common place on vehicles in the market and many drivers can't remember a time when they didn't have a back-up or front camera to assist them with reversing from a parking space or pulling into a tight spot. In addition to cameras attached to vehicles, the desire for driverless vehicles has led to a boom in using environmental cameras, such as traffic cameras, to communicate with vehicles to assist both with maneuvering and vehicle response. Despite the proliferation in cameras and digital media surrounding vehicles, industry has yet to solve the most basic unknown in vehicle navigation encountered by drivers, lack of peripheral vision.

Driver's performance would be substantially enhanced if a driver were made aware of, not only the immediate surroundings of the vehicle, but also the other vehicles or objects that are moving in the direction of the driver's vehicle and which may encounter the driver's vehicle within the time it takes the driver to make a navigation decision. Whether the driver is attempting to back out of a head-in parking place either on a street or in a parking facility, wants to pull out into a busy intersection, or is merely exiting his driveway, at present, he cannot always see left and right along driving lanes either at the front or the back of his vehicle. Vehicles that do have a rear-facing video camera can display real-time video on a monitor in the dashboard of the vehicle, but such cameras have limited, if any, peripheral vision.

With the continuing move toward driverless vehicles, many have proposed including a variety of car mounted imaging devices to track a vehicle and its surroundings, but none have proposed using those image capturing devices to solve the peripheral vision problem encountered by vehicles having drivers. As described herein image capture devices mounted on vehicles, alone or in combination with environmental image capturing devices, can immediately be used to solve significant navigation problems encountered by drivers on the road today.

Both vehicle mounted and environmental imaging devices can currently capture parts of the environment around a vehicle, but that information has to be presented to the driver in a manner that is both useful and not distracting. The method and system as described herein aims to solve the issues associated with a driver's lack of peripheral vision by providing a system and methods for providing the driver with a unified view of the area surrounding the driver's vehicle, information on objects entering the driver's reactionary zone, and an AR overlay providing the driver with relevant information on the movement and timing of objects that may enter the environment proximate the driver's vehicle.

BRIEF SUMMARY OF THE DISCLOSURE

In one embodiment, the disclosure describes a vehicle comprising a receiver for one or more image capture devices for capturing images of the environment surrounding the vehicle; a processor for processing the captured images in real-time, wherein the processor combines the images to provide a composite peripheral view within the driver's reactionary vision zone; a display device for receiving the images in real-time, the display device presenting the composite peripheral view in a plane appropriate to the driver's desired orientation; and a processor for generating, by way of a machine learning model, a simulation of the movement and timing of vehicles and/or objects moving into the driver's reactionary vision zone, wherein the simulation is based on the predicted path for the vehicles and/or objects; and a controller that displays an augmented reality overlay of the simulation to the display device or provides the driver with a recommendation for avoiding the vehicles and/or objects on the display device.

In another embodiment the disclosure further describes a computer-implemented method comprising, capturing, via an image capture device, an area surrounding a driver's vehicle wherein the area may include one or more other vehicles and/or objects that are moving toward the driver's vehicle; sending, in real-time, the captured images to a processor for combining the images into one or more composite images representing the periphery of the vehicle; receiving, via a display device, the peripheral image which capture a field of vision including the driver's reactionary zone; generating, by way of a machine learning model, an object trajectory and impact event prediction indicative of a future impact event between other vehicles and objects moving into the driver's reactionary zone, based upon the predicted path of the other vehicles and objects; displaying, via the display device, an augmented reality overlay, wherein the augmented reality overlay depicts a representation of the future impact event or provides the driver with a recommendation for avoiding the impact event.

DETAILED DESCRIPTION

Figure 1:
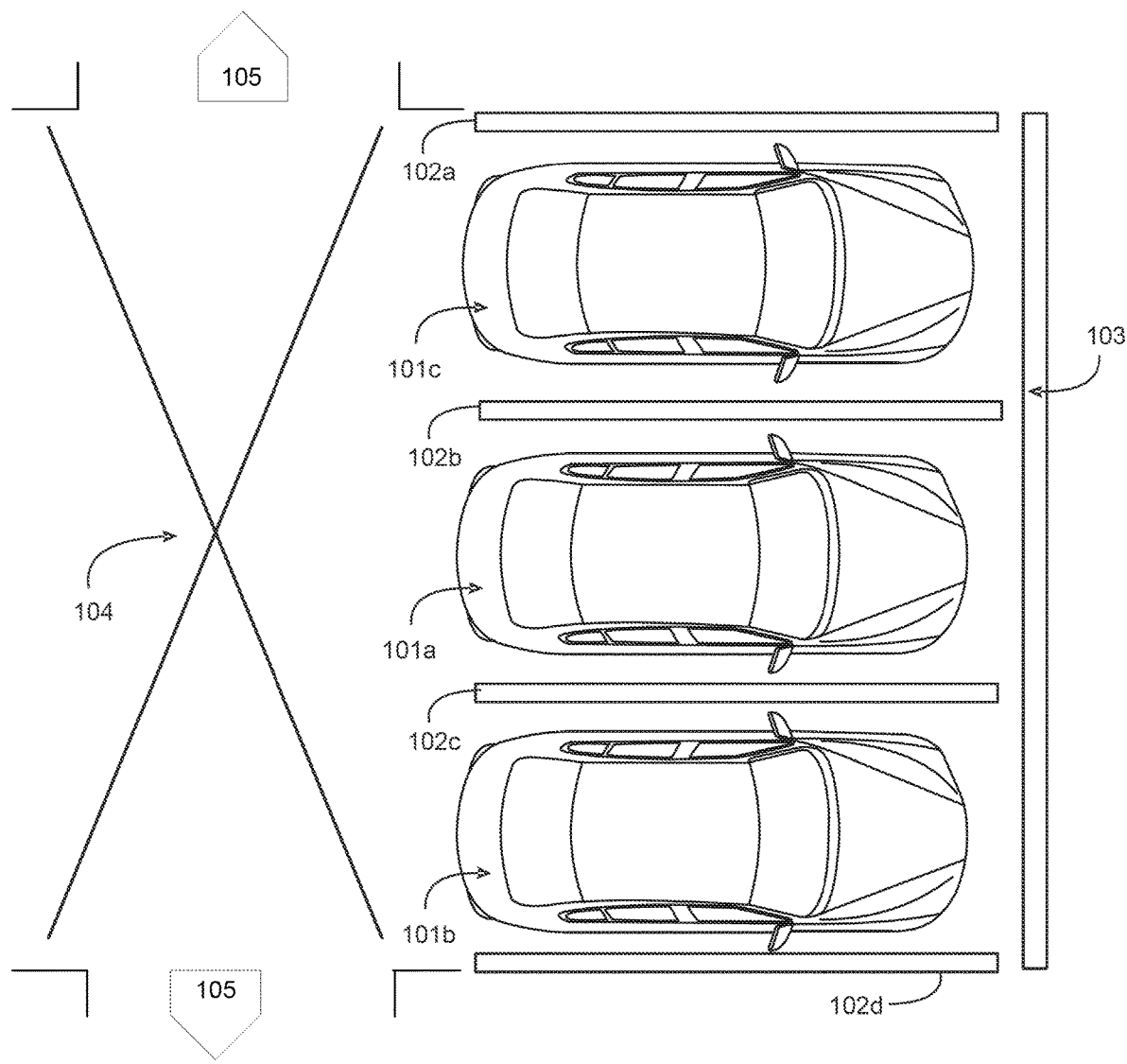
FIG. 1 is a diagram illustrating a parking area in one embodiment of the present disclosure.

The method and system as described herein aim to solve issues encountered by drivers when enhancement of their peripheral vision would substantially improve their ability to make informed driving decisions. The system as described has the potential to significantly improve driver safety and reduce the number of collisions involving secondary vehicles and other moving objects.

As used herein, a peripheral area around the driver's vehicle is defined as any area behind, in front of, or beside the vehicle including travel paths extending in each of those directions. For example, the peripheral area of a vehicle stopped at an intersection could include views of the travel directions to the left and right of the vehicle as well as a view of oncoming traffic. For a vehicle in motion, the peripheral view could include companion traffic moving in adjacent lanes, the traffic or objects traveling along cross streets that the vehicle would encounter, and oncoming traffic. For clarity and ease of understanding, this disclosure may refer to some subset of objects that a driver might encounter while driving, e.g., a pedestrian, bike, traffic, other vehicle, but it should be understood that the system is constructed to recognize all objects that might be encountered when driving and present information to the driver on any number of objects simultaneously. All discussions herein are based on that understanding and should be interpreted as such.

As used herein the "driver's reactionary zone" is defined by both area and time and relates to the area around a vehicle into which objects or other vehicles can move in the time it would take a typical driver to react to the object or vehicle and change or make an appropriate driving decision. For example, cars or bikes moving along a cross street that the driver is about to pass would be within the driver's reactionary zone. Likewise, bikes, pedestrians, other vehicles, or other objects moving in the direction of the driver's vehicle as the driver plans to pull out from a parking space are within the driver's reactionary zone. Additionally, when the driver's vehicle is moving at high speed along a highway, companion traffic and oncoming cars or bikes on the road for several hundred yards may still be within the driver's reactionary zone as the driver's reactionary zone is larger depending upon the speed of travel and geography.

In addition to the enhanced use of image capture to aide driver safety, the system as described herein further contemplates that use of AR to provide the driver with enhanced driving information in-real-time. AR is a known system for augmenting natural environments or situations and offering perceptually enriched experiences. In AR, information about one's surrounding world is digitally manipulated. AR typically lays virtual information over real world objects and environments. Augmented Reality (AR) as used herein is understood to mean a combination of real and virtual objects/images/sounds that interact in real-time and include accurate 3D registration between the virtual and real objects. As used herein "AR overlay" refers to any information that is generated digitally and projected over a 3-D representation of an image of the peripheral area surrounding a driver's vehicle as discussed herein, regardless of the nature or complexity of the information or its manner of generation.

The digital overlay in AR is generally fictionalized, but it may represent real information as appropriate, e.g., showing high winds or other environmental conditions. Fictionalized AR information can take the form of objects, commands, conditions, audio cues, and/or warnings or voice annotation/announcements, e.g., a warning sign to stop, an alert alarm, a secondary vehicle moving along an expected path, or representations of expected patches of ice. This fictionalized information is developed and presented to the driver over a 3-D composite image of the peripheral are surrounding the driver's vehicle developed from information that is received from image capture devices on the driver's vehicle or other environmental image capture devices. The AR overlay is designed to convey the desired tactical information to the driver at the desired level of urgency. Moreover, the display can involve simple word and phrases, such as "Stop" or "Do Not Cross". The display can also include symbols such as arrows and "X" s as well as colors such as red and green to communicate with the driver. The AR overlay can also present possible/probable object navigation forecasts for objects and other vehicles that might be traveling proximate the driver's vehicle.

Hardware components associated with producing the AR overlay are a processor, display, sensors, and input devices. For example, mobile computing devices such as smartphones and tablet computers contain these elements, typically include a camera and microelectromechanical systems (MEMS) sensors such as an accelerometer, GPS, and solid-state compass, making them suitable AR generation platforms.

The AR overlay may be generated by using object recognition and other art recognized AR systems such as computer vision, LIDAR, Milliwave radar, and the like, to ascertain information on objects in the vehicles peripheral environment and to determine the object's trajectory and speed, which will be referred to herein as the object's "navigational forecast." Machine learning models can be applied to both the environmental recognition and the objects navigation forecast to generate information on the expected path of the object and the possibility of interaction with the driver's vehicle. Machine learning models may also be applied to the determine the driver's navigational intent, for example, recognizing when the vehicle is placed in drive or reverse or when a blinker is engaged.

The AR is laid over a real image of the periphery of the driver's vehicle. The image is created from one or more images captures by either driver vehicle mounted image capture devices or from one or more environmental image capture devices. The images are loaded to a processor, and using machine learning models, common objects from the images are recognized and from the common objects, a composite image representing the desired area can be generated. As used herein "composite" image refers to a single image that has been generated by combining a series of images that are available from one or more image capture devices and stitching those images together to create a composite single image. As used herein "stitching together" of the images refers to applying object recognition to the images to find common objects and thereby ascertain overlapping regions from different images. The method as described herein uses those overlapping regions to determine adjacent views and then aligns the views using dynamic programming to create a single integrated composite image.

The system as described herein works in concert with traditional navigation systems that can be found onboard automobiles/vehicles or smart devices. The navigation system generally includes a Global Positioning System (GPS) configured to determine the position of the vehicles relative to space-based or terrestrial positioning systems, e.g., satellites or transmission towers. The system as described herein can be used in concert with any now-existing or after-developed methods or apparatus for determining the location of the driver's vehicle. While the particular method or system used to determine the position of the driver's vehicle is not critical, having an accurate position for the driver's vehicle is important as the position of the driver's vehicle is fundamental to ascertaining environmental information that may be used in concert with any images generated via the driver's vehicle to produce appropriate 3-D composite images. However, in the event that positioning data is unavailable, the instant system may still be used with images generated solely on the driver's vehicle.

Interaction action between the driver and the system is contemplated via a traditional command structure currently used by drivers to interact with their navigation systems and includes any mechanical knob or button, interactive display, voice activation, remote control, wirelessly via smart device, or any other traditional means for interacting with a vehicles on-board system. The command system allows the driver to fully interact with the system as described, including by way of examples, engaging and stopping the system, locating environmental image capture devices, selecting image orientation, applying overlays, etc.

FIG. 1 is a diagram illustrating a parking area in one embodiment of the present disclosure. Three vehicles 101a, 101b and 101c are shown parked side-by-side in three head-in parking places defined by walls 102a, 102b, 102c, 102d and end barrier 103. Area 104 illustrates a driving lane behind the three vehicles, which area is used by any one of the vehicles when backing out of its parking place. A driver of any one of the three vehicles may see to the rear into area 104 by use of rearview and sideview mirrors on the vehicle but has no clear view directly behind the vehicle and no peripheral view of the driving lanes 105 to the left and right of the rear of the vehicle. Backing out of such a parking place currently requires the driver to reverse slowly and incrementally until such time as he can see whether anything is moving toward his vehicle from the lanes 105. Current back-up cameras only allow the driver to see within a limited area usually within the space 104 and objects moving into the area surrounding the vehicle will only become visible to the driver once they cross into the area picked-up by a mirror or any back-up camera.

Modern back-up cameras mounted on the rear of the vehicle that display on a monitor built into the dashboard of the vehicle are incredibly useful, but they are generally stationary and are limited by the angle of the lens. Back-up cameras also suffer from the limitation that they can be hindered by objects that exist surrounding the vehicle, for example a garage wall, parking deck column, or other larger vehicles that might be proximate the driver's vehicle.

Figure 2:
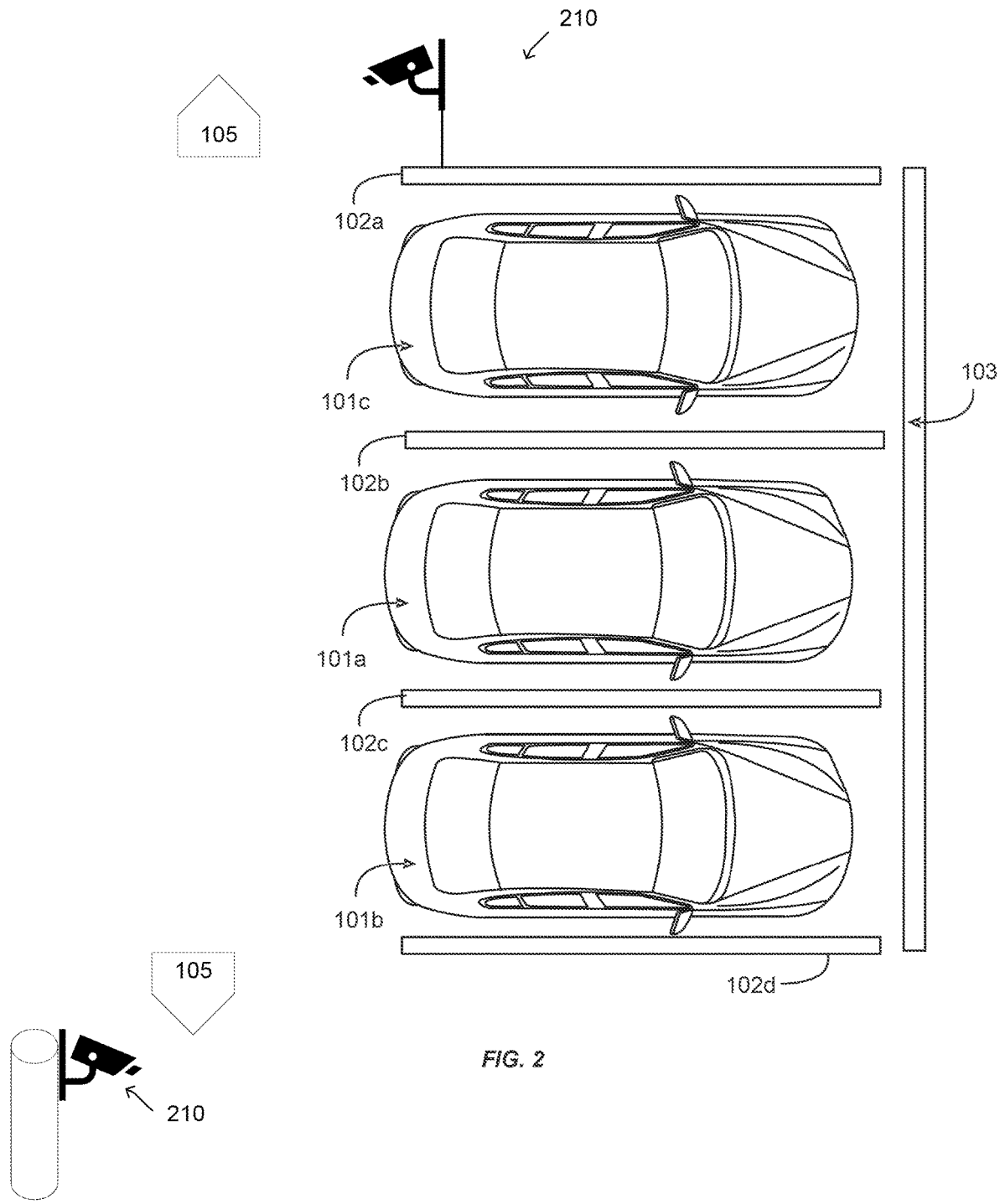
FIG. 2 is a diagram illustrating a parking area in one embodiment of the present disclosure

FIG. 2 is another diagram illustrating a parking area having the series of vehicles 101a, 101b and 101c parked side-by-side in three head-in parking places defined by walls 102a, 102b, 102c, 102d and end barrier 103. As seen in FIG. 2, peripheral driving lanes 105 to the left and right of the rear of the vehicles may be captured via security and pole camera(s) 210. In this embodiment, real-time images of the areas 105 to the left and right of the cars may be captured via environmental image capture devices and/or image capture devices that are included on the vehicle. The images captured by the devices can be used to create a composite image which image may be reoriented so that the driver may see the path along each side of his regress. Based on these images, the driver can know if anything might be moving into the area surrounding his vehicle. In this embodiment, backing out of the parking space becomes very easy since the driver knows whether something is moving into the area around the driver's vehicle. According to one embodiment, an AR overlays can be applied to inform him regarding any objects that are moving at sufficient speed to intersect with his vehicle while he is backing out. The AR overlay can also be used to indicate to the driver that he should remain in place until the object passes.

Figure 3:
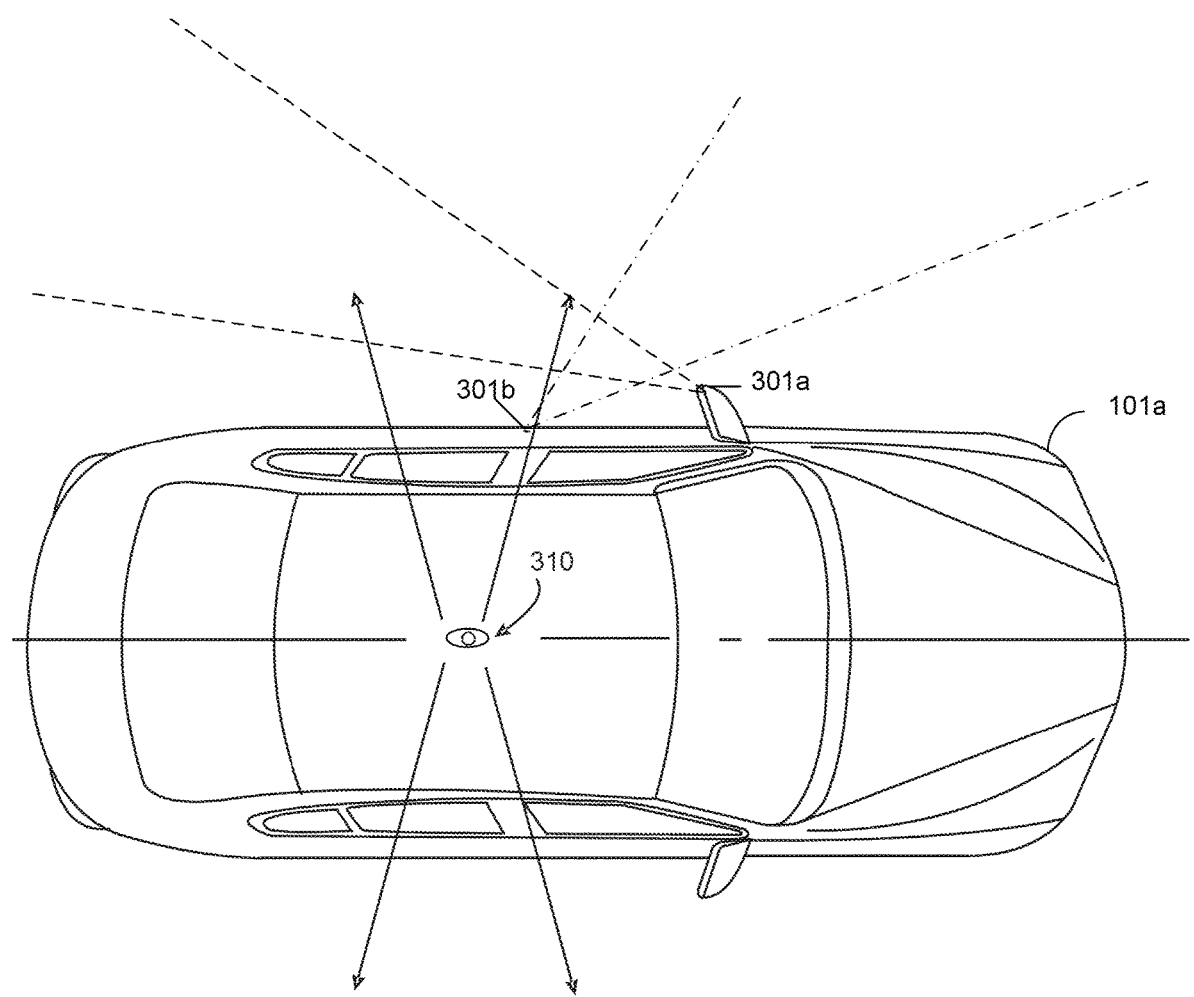
FIG. 3 is an enlarged top view of a vehicle from FIG. 1 illustrating image capture device(s) in a first embodiment of the present disclosure.

FIG. 3 is an enlarged top view of vehicle 101a of FIG. 1 illustrating one embodiment according to the present disclosure. Vehicle 101a in this example has image capture device(s) 301a, 301b and 310. Image capture devices 301a and 301b are implemented along the side of the driver's vehicle 101a and can capture areas to the front and rear along the sides of the vehicle 101a. While not shown, comparable image capture devices can be included along the other side of the vehicle. Device 310 is implemented at a center position on the roof of the vehicle. In this embodiment, the image capture device(s) may be single video cameras, fish-eye cameras, a series of video or fish-eye cameras oriented to capture images in different directions, a stack of video or fish-eye cameras, any combination of the above, or any other imaging equipment that can capture appropriate images in a sufficient area around the vehicle. As will be understood by the skilled artisan, any art recognized attachment apparatus/housing can be included to protect the imaging equipment. While merely described and not shown in the figures, according to one embodiment, the image capture device(s) on the roof may be attached to a lift mechanism that allows the image capture device(s) to be raised above the car to improve the range of available images. Such a system is described in reference to the front camera below and appropriate roof versions would be well understood by the skilled artisan.

In all embodiment as described herein where the driver's vehicle includes image capture devices, those devices can include one or more image sensors including any combination of known image sensors regardless of whether the particular discussion herein is referencing a single type of sensor, for example, camera, video, or LIDAR. All embodiments as described herein can include any still or video camera, including for example, high dynamic range (HDR) cameras, or sparse color array imagers or light detection and ranging (LIDAR), sometimes called "laser scanning" or "3D scanning." LIDAR uses eye-safe laser beams to create a 3D representation of the surveyed environment and can also be used to obtain images of the peripheral area or they can be used in concert with other camera types in the systems and methods described.

Figure 4:
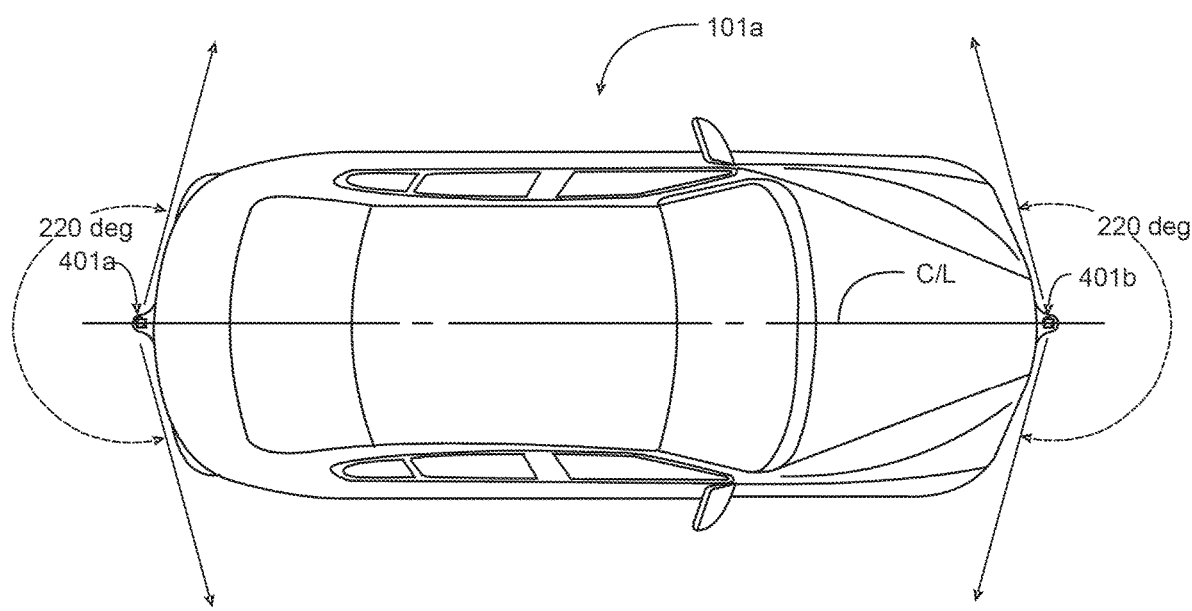
FIG. 4 is an enlarged top view of a vehicle from FIG. 1 illustrating image capture device(s) in a second embodiment of the present disclosure.

FIG. 4 is an enlarged top view of vehicle 101a of FIG. 1 illustrating another embodiment of the present disclosure. Vehicle 101a in this example has an image capture device 401a implemented at a center position on the rear of the vehicle, and a similar image capture device 401b implemented at a center position on the front of the vehicle. According to one embodiment, the image capture device(s) are placed as far forward or back as is practical and may differ on many different models of vehicles. The image capture device(s) at the front and the rear according to an embodiment of the disclosure may be identical or may be different in some or all respects. According to one embodiment, the image capture device(s) may be combined with framing that protects the image capture device(s) from damage. In one embodiment the image capture device(s) may be integrated with a decorative hood ornament. As described regarding the roof device 310, the skilled artisan would understand that the image capture devices 401a and 401b can include a mechanized extension pole that would, under the appropriate circumstances, allow the devices to be moved to a position further in front or behind the vehicle 101a to provide an extended image capture.

Both the image capture device(s) 401a and 401b in the front and the rear have one or more image sensors capable of facing at a relatively sharp angle to either side of a longitudinal centerline C/L through the vehicle. According to one embodiment for front and rear mounted image capture device(s), the viewpoint angle with C/L will range from one side to the other at least ninety degrees, and in most circumstances will be capable of viewing through an arc of 220 degrees, or more, as depicted by arrows to each side from apparatus 401a and 401b and the viewpoint arc indicated. In one embodiment, the vehicle 101a may combine the roof mounted image capture device(s) 310 with the front and rear mounted imaging systems 401a and 401b.

Figure 5:
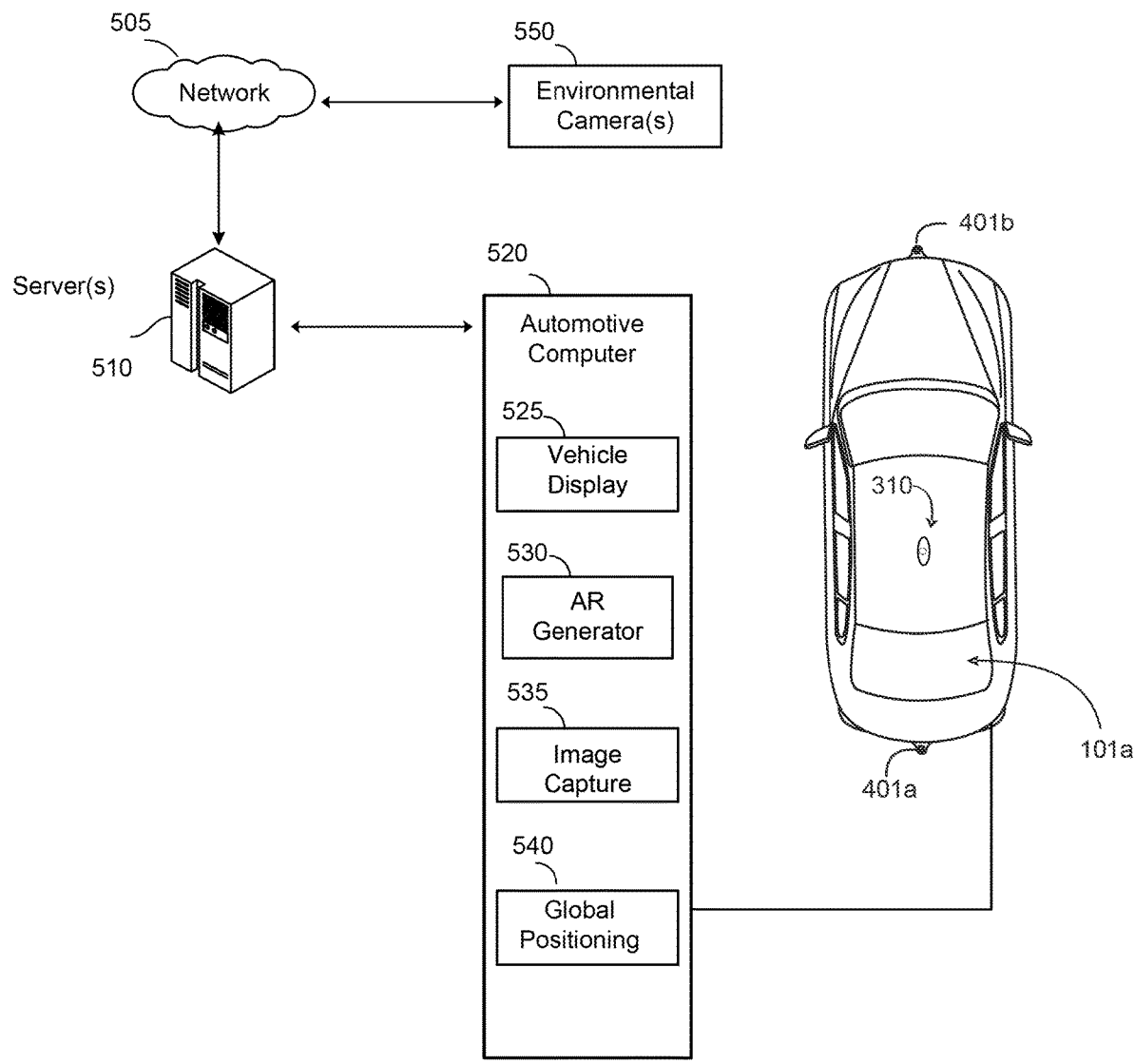
FIG. 5 is a top view of a vehicle with system and network components according to one embodiment of the disclosure.

FIG. 5 illustrates a functional schematic of a system that may be used to locate the vehicle, locate and/or generate the images needed to create a composite image of the peripheral space around the driver's vehicle, generate an AR image to accompany the composite image, and display the information to the driver to assist the driver in making an appropriate driving decision. The on-board automotive computer 520 may communicate with the server 510, network 505, and environment cameras 550, and any other devices associated with the operation of the driver's vehicle by way of the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The global position system 540 may be included with the driver's vehicle navigation system or can be a stand-alone system that determines the vehicle location and provides real-time location information to the automotive computer 520 one use of which is to determine whether appropriate environmental image capture is available. Environment image capture can include any type of traffic cameras, red light cameras, speed cameras, toll cameras; satellite images including for example, commercial satellites or google earth; any type of security camera including public and private security cameras associated with transportation and logistics, government buildings, smart cities, retail establishment and the like.

The image capture 535, a receiver, collects images from any image capture devices (301a, 301b, 310, 401a, 401b, 901a-d) on the driver's vehicle 101a and any environmental images that are available and appropriate and then processes the images as discussed above to create the composite image around the periphery of the driver's vehicle 101a. The captured images are also used by the AR generator 530, a controller, to determine whether any other vehicles or objects are proximate the driver's vehicle. The AR system using machine learning algorithms can determine the projected navigational forecast for the objects and therefrom generate appropriate driver warnings related to those objects and other vehicles. The composite image and AR overlay are provided to the driver via the vehicle display 525. As will be readily apparent, the composite images may be generated in the same plane as the driver's eyeline or could be another image, such as a birds-eye-view, as desired.

According to one embodiment, the driver's vehicle may be equipped to use vehicle-to-everything communication protocols (V2X), such as the Dedicated Short-Range Communication (DSRC) communication protocol, which would allow the driver's vehicle to receive information from devices such as other vehicles, infrastructure devices and even mobile devices that may be equipped with V2X. V2X can be implemented either at 75 MHz of spectrum in the 5.9 GHz band via the FCCs Intelligent Transportation Systems (ITS) or it may be implemented via cellular using existing LTE 4G and 5G networks. Either embodiment would be appropriate for use in the instant disclosure.

Using V2X, the driver's vehicle can receive information about other vehicles, pedestrian smart devices, infrastructure devices or the like, when it is available. For example, a human driver may be able to observe that a vehicle is nearby but cannot ascertain the speed or exact direction of travel. With V2X communication, if the other vehicle is appropriately equipped, it may send a signal that can be obtained by the driver's communication system indicating exactly how fast the nearby vehicle is travelling, its specific location, heading, etc. The automotive computer in the driver's vehicle 520 can then provide that information to the AR generator 530 to improve the accuracy of the information provided to the driver via the AR overlay.

Figure 6A:
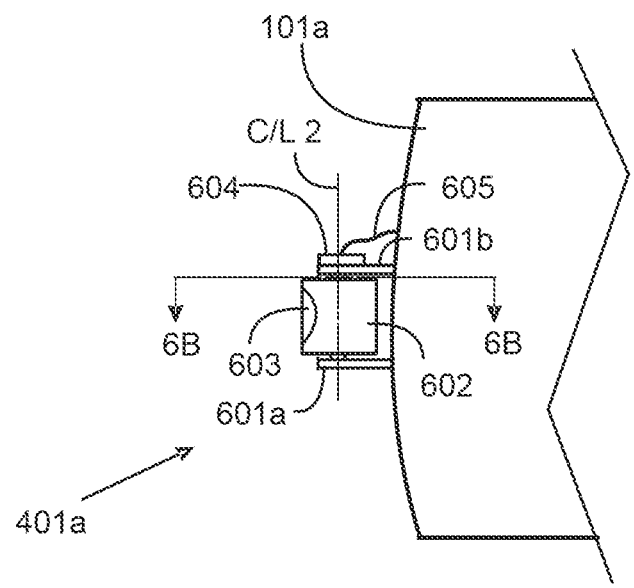
FIG. 6A is an enlarged elevation side view of an image capture device of FIG. 4 in a second embodiment of the disclosure.

FIG. 6A is an elevation side view of image capture device 401a in one embodiment. Image capture device 401a in this embodiment has a frame comprising a lower support 601a and an upper support 601b, between which a cubical structure 602 is pivotally suspended. Structure 602 has an imaging element 603, in one instance a video camera, implemented to capture images from a viewpoint in one direction. Structure 602 is rotated by a rotary mechanism 504 around a centerline C/L 2. Power, commands, and images are transmitted wirelessly or via a cable 605 to or from vehicle's automotive computer 520 or to any other capture mechanism in the driver's vehicle 101a.

Figure 6B:
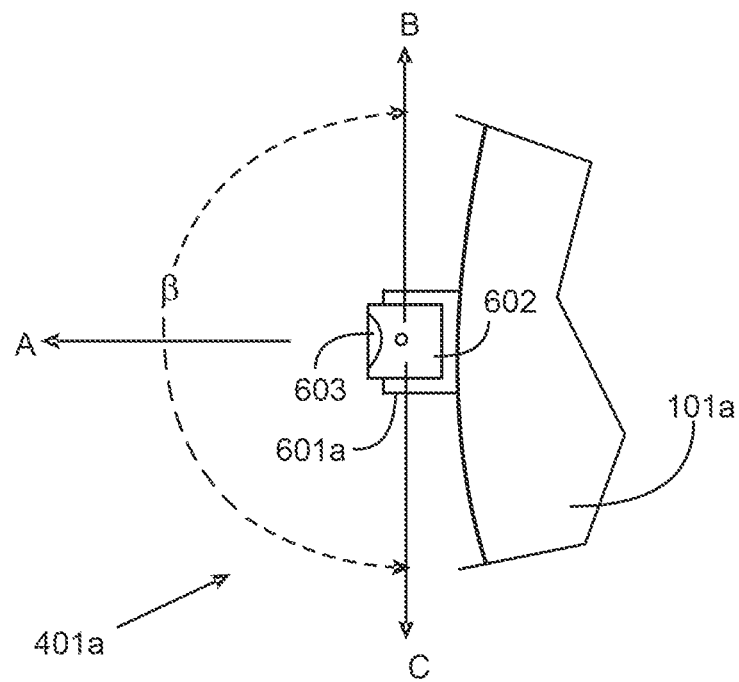
FIG. 6B is a top plan view of the image capture device of FIG. 6A.

FIG. 6B is a plan view of structure 602 seen from section line 6B-6B of FIG. 5A, to illustrate operation and function. In the instant view imaging element 603 is directed along direction A directly to the front of vehicle 101a. Imaging element 603 may, by operation of mechanism 604 of FIG. 5A be directed along direction B and may be rotated to view along directions through direction A to direction C, that is, thorough an arc of 180 degrees. As such, using the device as illustrated, imaging may be accomplished from the rear of vehicle 101a to the rear and to each side fully ninety degrees from the C/L of the vehicle.

Figure 7A:
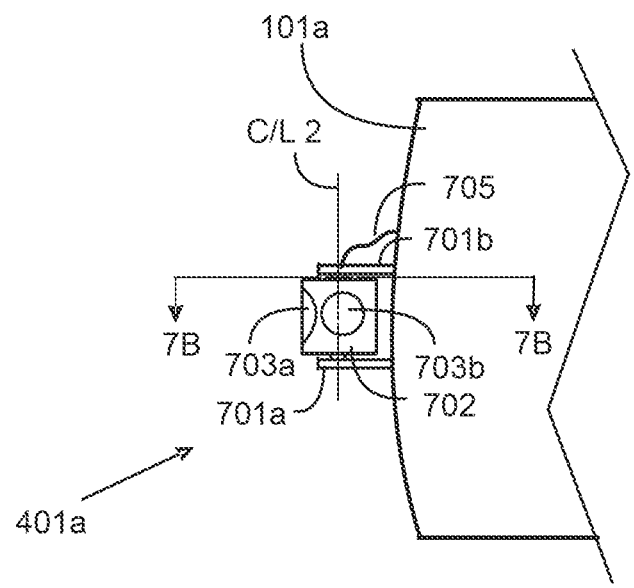
FIG. 7A is an elevation view of a third image capture device in another embodiment of the disclosure.
Figure 7B:
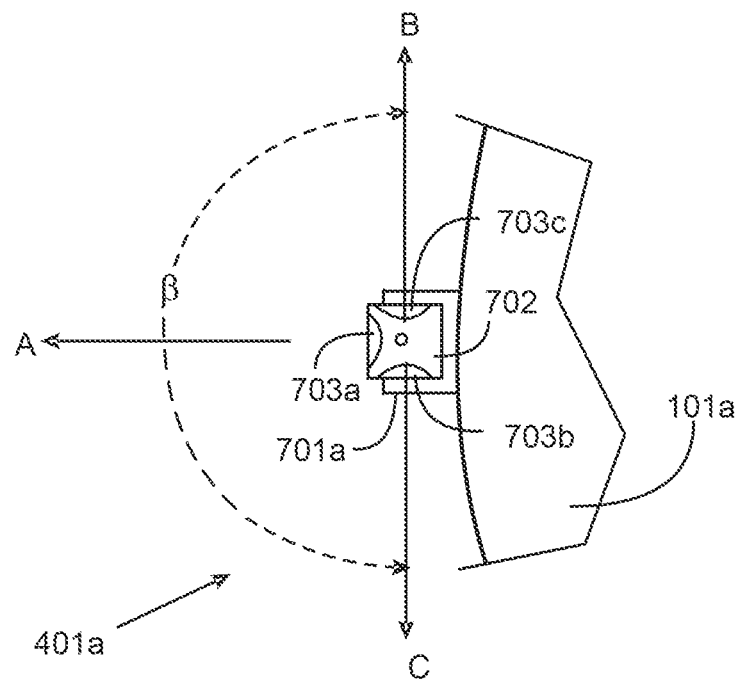
FIG. 7B is a plan view of the device of FIG. 7A.

FIG. 7A is an elevation side view of image capture device 401a in an alternative embodiment, and FIG. 7B is a plan view. In this example structure 702 has three imaging elements 703a, 703b and 703c directed orthogonally from one another. Structure 702 is fixed between lower support 701a and upper support 701b and does not rotate. Power and image data is transmitted between imaging device 401a and vehicle 101a wirelessly or on a cable 705. As may be seen in FIG. 7B imaging element 703a looks directly ahead in direction A, element 703c looks to one side in direction B, and element 703b looks to the opposite side in direction C. As each image from each element has a relatively broad field of view, most if not all the range, may be monitored effectively.

Figure 8:
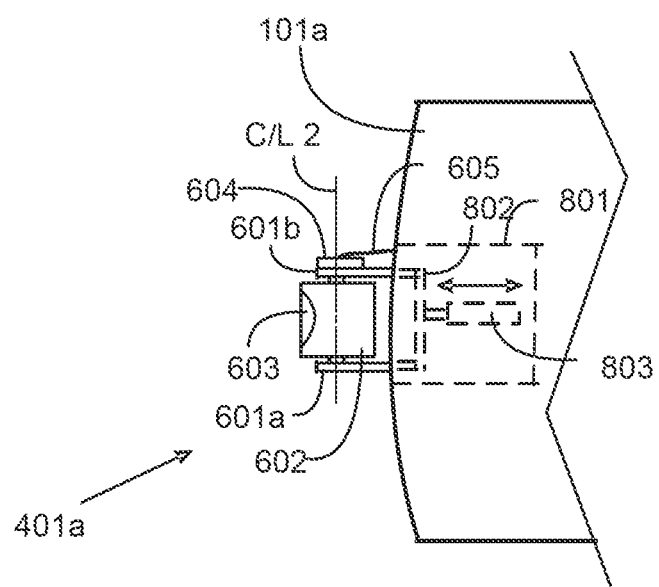
FIG. 8 is a plan view of the device of FIG. 6A in an alternative embodiment.

FIG. 8 is a plan view of the device of FIG. 6A in an alternative embodiment. In this embodiment a compartment 801 is provided into a portion of the front of vehicle 101a to hold the image capture device(s) when not in use. Upper support 601b and lower support 601a are a part of a carriage 802 that may be withdrawn into compartment 801 and deployed again as needed by a translation mechanism 803. Mechanism 803 may be accomplished for example by a hydraulic of a pneumatic cylinder, or by other mechanical means. Having the apparatus 401a withdrawn into the compartment avoids damage that might occur with the device exposed on the front of the vehicle. As will be apparent to the skilled artisan such a hydraulic or pneumatic cylinder could be used to raise and lower any image capture device, e.g., 310 on the vehicle roof.

Figure 9:
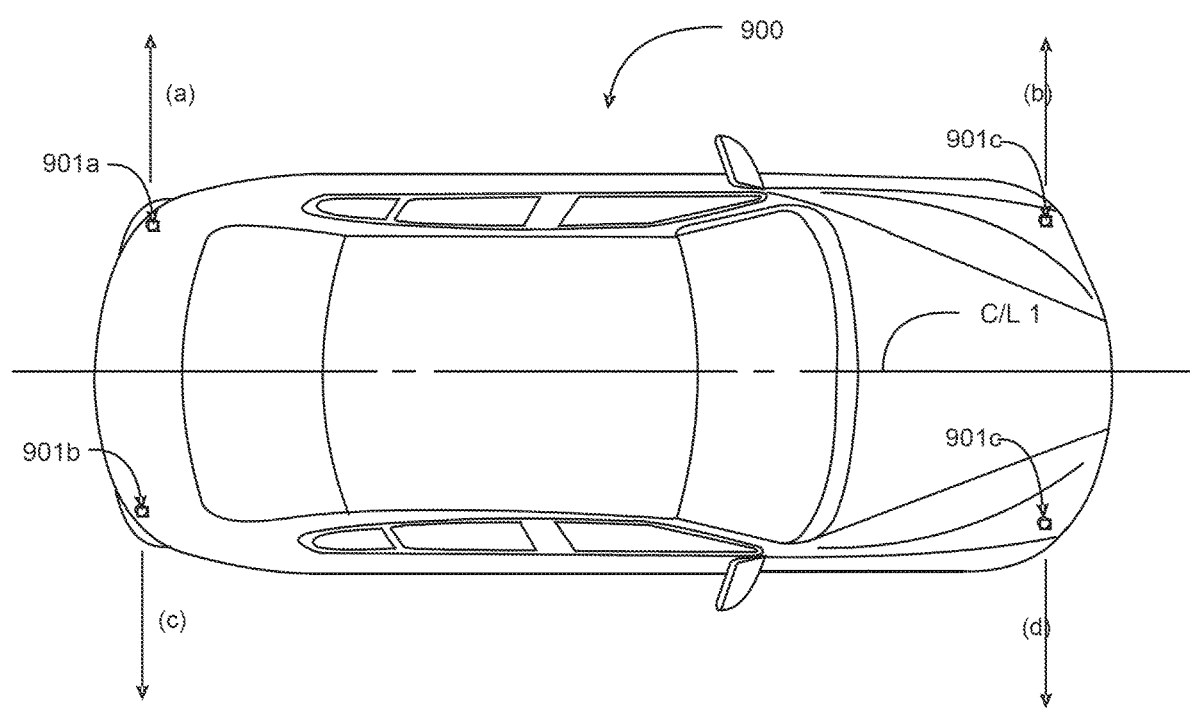
FIG. 9 is a plan view of a vehicle with image capture device(s) in yet another embodiment of the disclosure.

FIG. 9 is a plan view of a vehicle 900 according to another embodiment of the disclosure in which additional or exclusive image capture devices are placed on the corners of the driver's vehicle, with image capture devices 901a and 901b in the rear and image capture devices 901c and 901d in the front. The image capture device(s) may be in one embodiment integrated with headlights and taillights of the vehicle or may be separate equipment. The image capture device(s) may be, as discussed above, video cameras and/or sensors of other sorts, such as proximity sensors or LIDAR sensors. In the embodiment of FIG. 9 the image capture devices may be stationary and directed to one side as depicted by arrows (a), (b), (c) and (d) in association with the image capture device(s). This does not mean the image capture device(s) at each corner can see just in the direction of the arrows. As the image capture devices have a broad field of vision the arrangement shown can provide image acquisition in a broad sweep from each image capture device. Such a representation can be seen, for example, in FIG. 3 regarding image capture devices 301a and 301b. Accordingly, with this embodiment images may be collected at from substantially all directions from the vehicle. In one embodiment, there may be circumstances to justify image capture devices that may be rotatable, and that may be deployed and withdrawn as described above with reference to FIG. 6.

Figure 10:
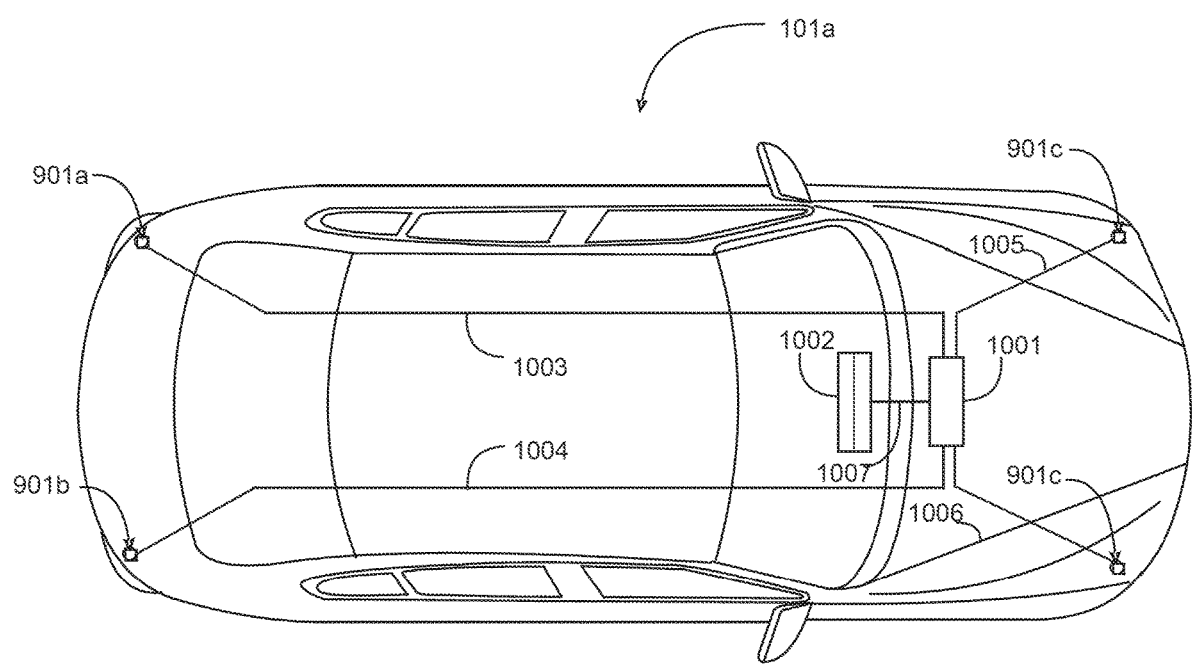
FIG. 10 is a top view of a vehicle with electronic components and connections according to another embodiment of the disclosure.

FIG. 10 is a top view of vehicle 101a with electronic components and connections indicated in one embodiment of the disclosure, particular to the embodiment of FIG. 9 with sensors at corners of the vehicle. In this embodiment, a computerized image processing apparatus 1001 is connected to each apparatus 901a through 901c by cables 903, 904, 905 and 906. As will be readily apparent to the skilled artisan, this embodiment is a more mechanical, self-contained embodiment, but could easily be implemented using the automatic computer and wireless system as described in FIG. 5.

In FIG. 10, apparatus 1001 receives image and sensor data from the image capture device(s) and processes the data to a suitable form to provide to an operator console 1002 by a connection 1007. Image data may also be stored in a coupled data repository, retrievable by the computerized at later times. Console 1002 may comprise a display monitor, such as an LED or LCD display, and may also have audio capability (a speaker) and input mechanisms for a user to configure and query computerized apparatus 1001.

Figure 11:
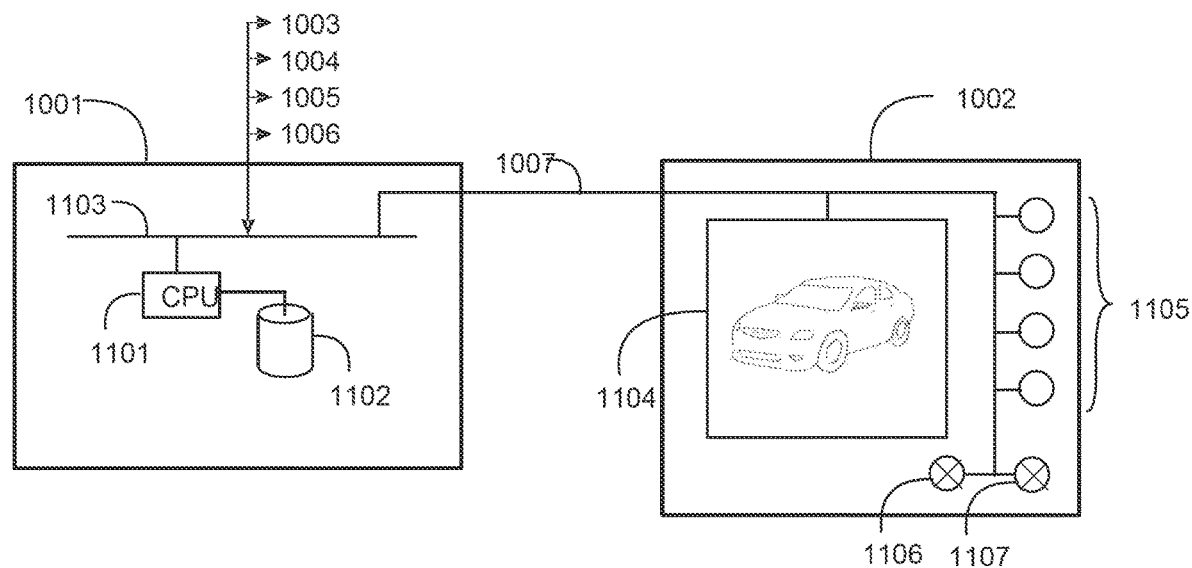
FIG. 11 is a diagram of the computerized elements of a system according to the embodiment of FIG. 10.

FIG. 11 is a diagram depicting console 1002 and computerized apparatus 1001 in one embodiment of the disclosure. Computerized apparatus 1001 comprises in this example a CPU 1101 coupled to a digital memory 1102 and to a bus system 1103. Two-way communication paths 1003, 1004, 1005 and 1006 connect to bus 1103. Console 1002 is coupled to bus 1103 by path 1007, and display monitor 1104 and input buttons 1105 provide signals to CPU 1101 via path 1007 as well. A person of skill in the art will understand that this depiction is just one example of how the necessary functions may be implemented in apparatus.

Paths 1003 through 1006 are two-way communication because the image capture device(s) at the corners or at the rear may require operating commands as well as sending images back to the computerized apparatus. Input buttons 1105 are representative of all sorts of input mechanisms which may include switches, rotating knobs, buttons, and so forth. In some embodiments inputs may be virtual and may be displayed on display monitor 1104. A microphone 1107 and a speaker 1106 are provided allowing a user to make voice commands and allowing the system to provide audio and speech feedback to the user.

Figure 12:
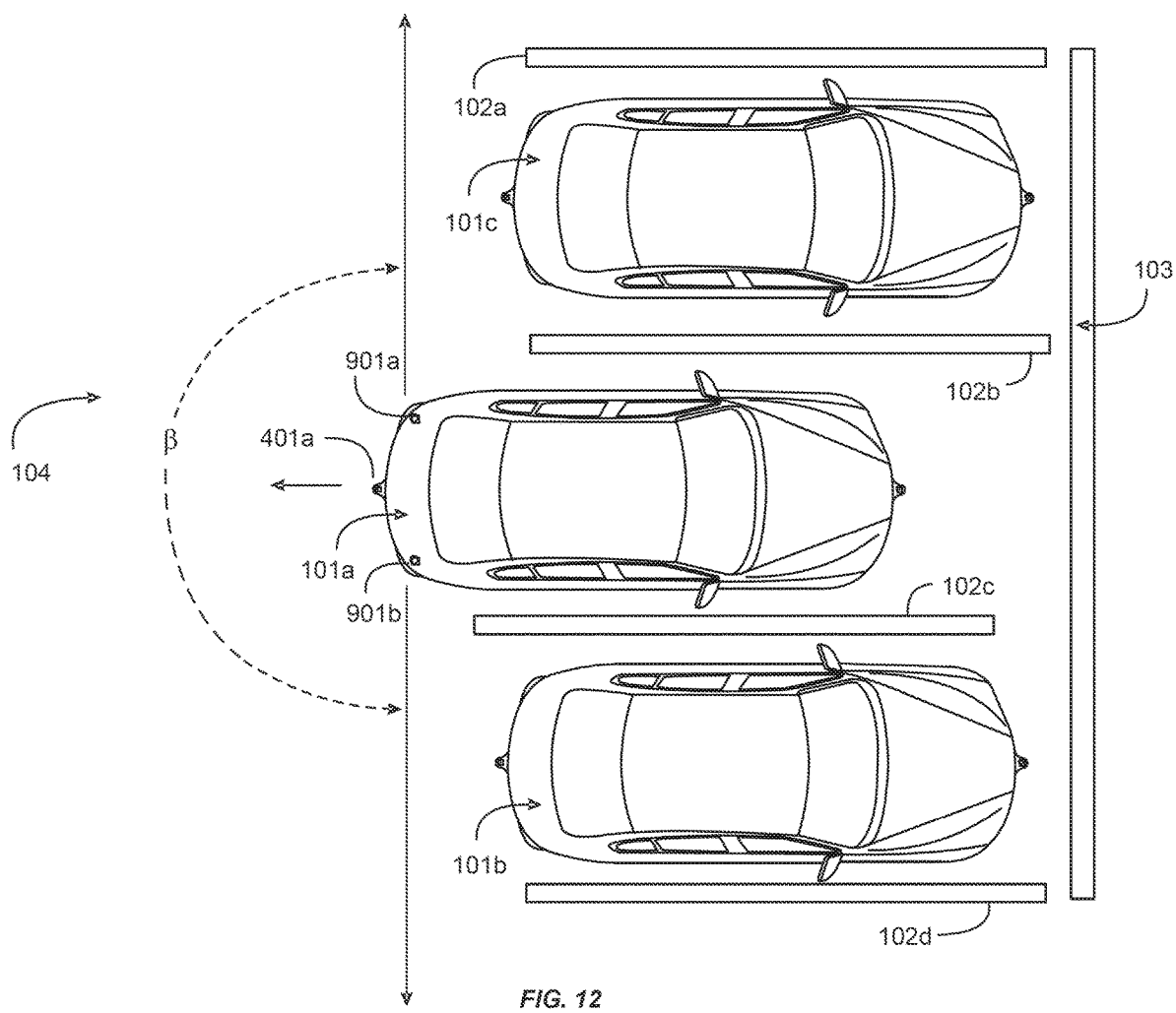
FIG. 12 illustrates a vehicle backing out of a head-in parking space.

FIG. 12 illustrates vehicle 101a backing from a head-in parking place into traffic area 104. Vehicle 101a is shown after backing a short distance, say two feet, which position would not expose the vehicle to any competing traffic to the rear. At this point, and indeed even before moving at all, corner image capture device(s) 901a and 901b provide unobstructed peripheral vision in both directions orthogonal to the direction of the vehicle, as indicated by arrows 901 and 902. Image capture device 401a, if used in combination or instead, similarly provides unobstructed imaging throughout the entire 180 degrees to 220 degrees field of view arc to the rear, which may be accomplished by rotating a camera if the rotating version is used or combining images from three cameras if the fixed version is used (see FIGS. 6A and 6B and 7A and 7B, and descriptions referring to these figures).

At the point in backing shown for vehicle 101a in FIG. 12 the system may display images on monitor 1104 in split screen in one embodiment or may display images one at a time for a fixed period in a predetermined order, depending on the operating system. In some embodiments the user may be enabled to select the method of display. In an embodiment dependent solely on images visually monitored by the user, the user simply glances at the images displayed and proceeds accordingly. If there are no pedestrians behind or near the rear of the vehicle, and no vehicles approaching from either side, the user may feel free to continue backing and maneuvering to leave the parking space and drive away, monitoring the images as needed.

Figure 13:
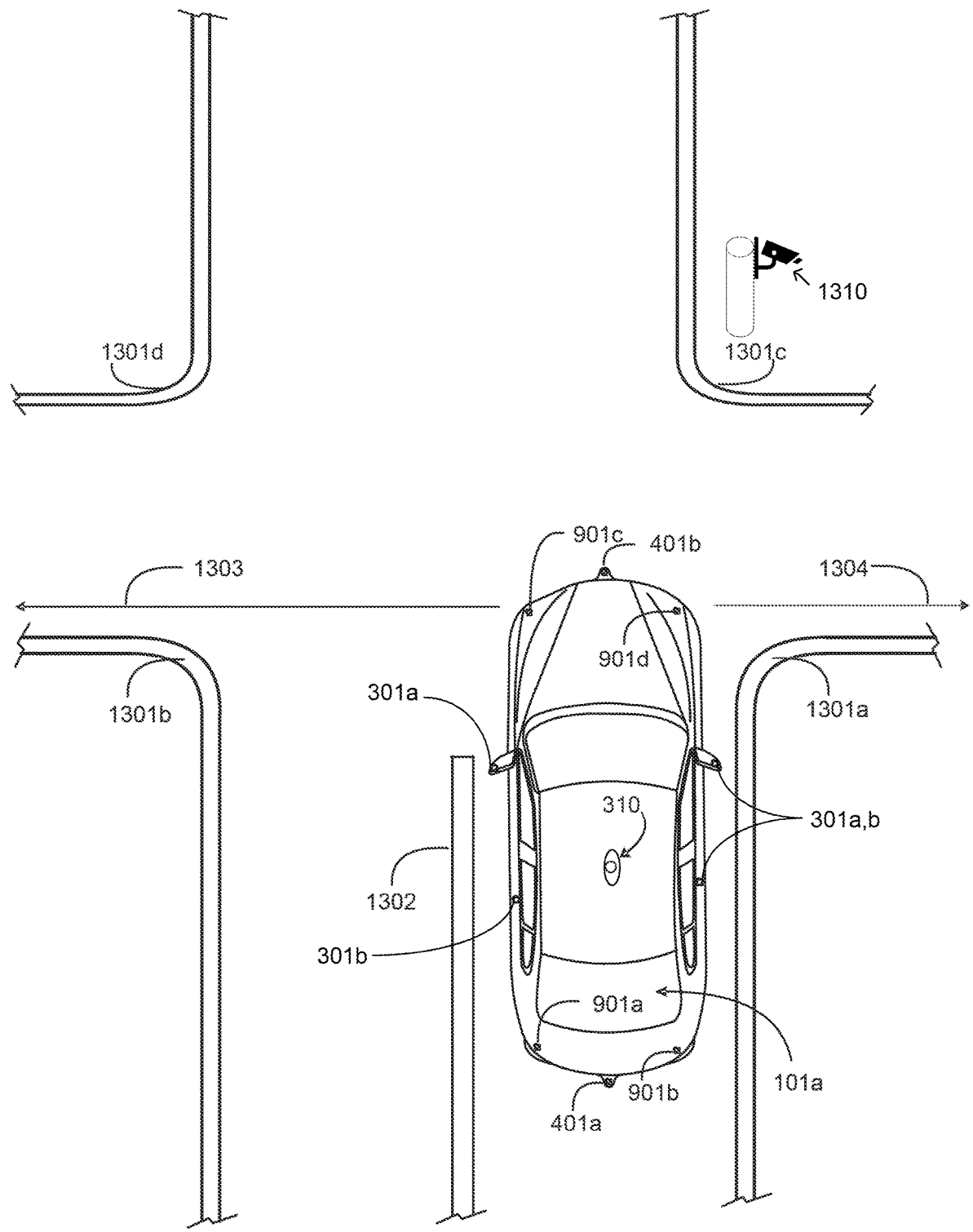
FIG. 13 illustrates a circumstance at an intersection in an embodiment of the disclosure.

FIG. 13 illustrates vehicle 101a at an intersection, with the vehicle proceeding a short distance into the crossroad. Curbs 1301a, 1301b 1301c, 1301d are edge definitions of the roadway and may be raised curbs or markings on pavement. A center stripe 1302 is indicated and divides the roadway. There may be a crosswalk (not shown) laterally in front of vehicle 101*a*.

It is well-known that the view from the driver's seat of vehicle 101*a* will likely be obstructed. Image capture device(s) 901*a*-901*d*, 301*a*, 301*b*, 310, 401*a*, 401*b*, and 1310 can provide greatly enhanced lateral views. While this embodiment is show with a single environmental camera, it is well understood that the system could access any available environmental cameras with would include roadway information peripheral to the vehicle 101*a*. Arrows 1303 and 1304 indicate unobstructed peripheral vision for the image capture device(s) in this circumstance. Images from the image capture devices may be processed to form a composite image and displayed on the display device within the driver's vehicle. As discussed above, images may be presented in any preferred way, e.g., in split screen, sequentially, or in panorama, and the user may rely on glancing at the images to proceed safely into the intersection. If the user is turning right or left, or proceeding across the intersection, the image capture devices may display pertinent images enabling the user to proceed with an enhanced degree of safety.

In one embodiment as described, the system may be engaged by the driver to assist with particular maneuvers, for example, pulling or backing out of a parking space of moving through an intersection from a stop. According to another embodiment, all the image capture devices may be active and operating when the ignition switch is on, and there may be an operating system that will generate a composite image of the peripheral area around the driver's vehicle and provide constantly updating AR overlays to provide the driver with alerts and information that can assist him in making improved driving decisions.

Systems according to embodiments of the disclosure may include predictive analysis of not only the immediate area but areas beyond and may detect oncoming vehicles or other objects that are in motion beyond the immediate area of the path of the user's vehicle. In this embodiment, oncoming, i.e., not currently in eye view threats, may be shown or highlighted, and the user may be alerted.

Installation and/or final deployment of systems according to embodiments of the disclosure may be through manufacturer participation, third party applications, or possibly kits that can be purchased after market. In an aftermarket system image capture devices and computerized elements may be provided in kit form with instructions for assembly and operation. While the disclosure as discussed herein refers to the visual display being a part of the on-board vehicle system, the systems and methods as described can be presented via a smart device or other display as would be readily understood by the skilled artisan. Smart devices can include devices such as a smart phone, tablet, smart watch, personal Global Positioning System (GPS), or a dedicated device designed explicitly for the current purpose. Alternative presentations and App(s) for performing the method described herein are fully contemplated.

The skilled person will understand that the embodiments described above are entirely exemplary, and not limiting to the scope of the disclosure. Many variations may be made in the materials, dimensions, and the like within the scope of the disclosure.

We claim:

1. An after-market kit for equipping a vehicle with enhanced peripheral vision comprising:
   one or more image capture devices for mounting on the vehicle, wherein the image capture devices are sized to capture an area around the vehicle sufficient to include objects that may interact with the vehicle;
   a receiver for collecting one or more images from the one or more image capture devices;
   a processor for processing the captured images in real-time, wherein the processor combines the images to provide a composite peripheral image;
   a controller for locating an object from the captured images, the object having a speed and trajectory, and determining from the object's trajectory and speed, a possible interaction between the object and the vehicle and generating an Augmented Reality (AR) overlay for display over the composite peripheral image to convey tactical information to a driver of the vehicle at an appropriate level of urgency;
   and a display device for receiving the composite peripheral image and (AR) overlay, wherein the display device presents the composite peripheral image in a plane appropriate to the driver's desired orientation and displays the images to the driver.

2. The kit of claim 1, wherein the receiver, processor, controller and display are included in a dedicated device in the kit.

3. The kit of claim 1, wherein one or more of the receiver, processor, controller or display are included in on-board systems in the vehicle and the image capture devices interact with the on-board systems wirelessly via one or more of transmission control protocol/Internet protocol (TCP/IP), Bluetooth®, Wi-Fi based on the Institute of Electrical and Electronics Engineers (IEEE) standard 802.11, Ultra-Wide Band (UWB), Cellular Data, Fifth Generation (5G) and/or Global System for Mobile Communications (GSM).

4. The kit of claim 3, wherein the image capture devices interact with the on-board vehicle system via an App.

5. The kit of claim 1 wherein one or more of the receiver, processor, controller and display are included in a smart phone, a tablet, a smart watch, or a personal Global Positioning System (GPS).

6. The kit of claim 1, wherein the receiver, processer, controller and display are included in a smart phone.

7. The kit of claim 1, wherein the one or more image capture devices are configured for mounting on a roof or along a centered line running between the front and back of the vehicle.

8. The kit of claim 7, wherein the kit comprises at least two image capture devices configured for mounting along the centered line at the front of the vehicle and along the centered line at the back of the vehicle.

9. The kit of claim 7, wherein the kit comprises at least four image capture devices configured to be mounted on a forward left corner of the vehicle, a forward, right corner of the vehicle, a rear, left corner of the vehicle, and a rear, right corner of the vehicle.

10. The kit of claim 1, further comprising a navigation system comprising a GPS locator.

11. The kit of claim 1, further comprising a command structure for interaction between the driver and the display device.

12. The kit of claim 1, further comprising a receiver for receiving images captured from one or more environmental image capture devices.

13. An after-market kit for implementing a driver assistance method for a driver's vehicle comprising:
   a processor for
      capturing images in real time from one or more image capture devices mounted on the driver's vehicle or environmental image capture devices located in an area around the driver's vehicle to provide a composite peripheral image of a driver's reactionary zone;

locating one or more other vehicles or objects from the captured images;

generating, by way of a machine learning model, a navigational forecast for the one or more other vehicles or objects located in the captured images; and, a controller for receiving from the processor at least one other vehicle or object's trajectory, speed, and possible interaction with the driver's vehicle; and generating an Augmented Reality (AR) overlay in real-time for display over the composite peripheral image to convey tactical information to the driver of the vehicle.

14. The kit of claim 13, wherein the AR overlay depicts a representation of a future impact event.

15. The kit of claim 13, wherein the AR overlay provides the driver with a recommendation for avoiding an impact event.

16. The kit of claim 13, wherein the composite image and AR overlay are displayed on smart device.

17. The kit of claim 16, wherein the smart device is a smart phone.

18. The kit of claim 13, wherein the composite image and AR overlay are displayed on an on-board vehicle display.

19. The kit of claim 13, wherein the processor communicates with the image capture devices wirelessly via one or more of transmission control protocol/Internet protocol (TCP/IP), Bluetooth®, Wi-Fi based on the Institute of Electrical and Electronics Engineers (IEEE) standard 802.11, Ultra-Wide Band (UWB), Cellular Data, Fifth Generation (5G) and/or Global System for Mobile Communications (GSM).

20. An after-market kit for equipping a driver's vehicle with enhanced peripheral vision comprising:

one or more image capture devices for mounting on a driver's vehicle, wherein the image capture devices are sized and configured to capture an area around the vehicle sufficient to include objects and/or other vehicles in a driver's reactionary zone; and a computer implemented method (App) wirelessly connecting the one or more image capture devices with a smart phone, the smart phone configured to:

receive one or more images from the one or more image capture devices;

process the captured images in real-time to generate a composite peripheral image;

locate objects or other vehicles in the driver's reactionary zone from the captured images;

determine the other vehicles' or objects' trajectory, speed, and possible interaction with the driver's vehicle;

generate an Augmented Reality (AR) overlay for display over the composite peripheral image to convey tactical information to the driver of the vehicle at an appropriate level of urgency; and display the composite peripheral image and (AR) overlay to the driver.

* * * * *